July 31, 1928. 1,678,758
W. J. BARCLAY
ATTACHMENT FOR CHECKROW PLANTERS
Filed Feb. 24, 1925
Fig. 1.
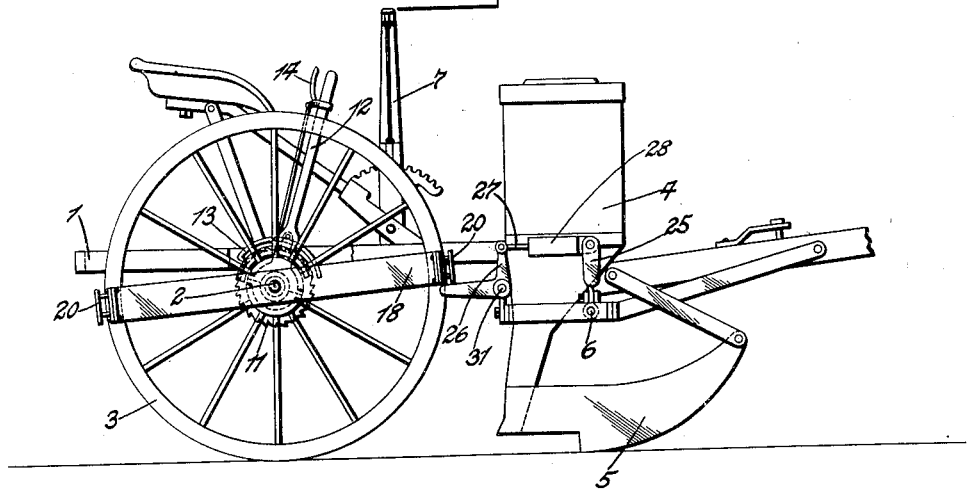
Fig. 2.
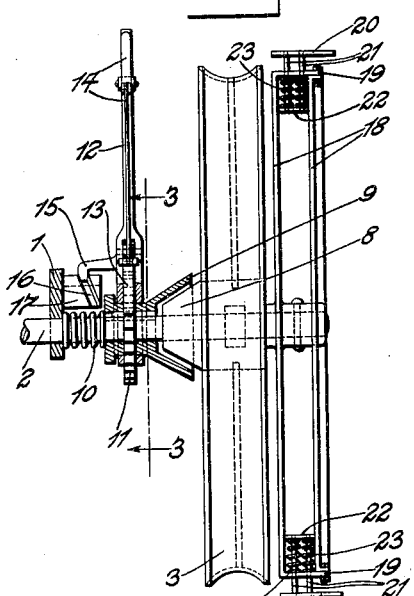
Fig. 3.
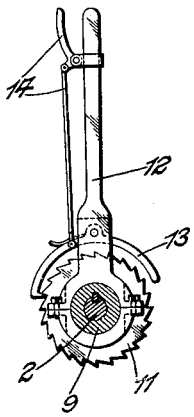
Fig. 4.
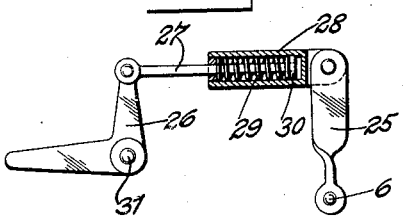
Fig. 5.
Inventor.
William J. Barclay,
By Rippey & Kingsland
His Attorneys.

Patented July 31, 1928.

1,678,758

UNITED STATES PATENT OFFICE.

WILLIAM J. BARCLAY, OF SPRINGFIELD, MISSOURI, ASSIGNOR OF ONE-HALF TO W. A. KING, OF SPRINGFIELD, MISSOURI.

ATTACHMENT FOR CHECKROW PLANTERS.

Application filed February 24, 1925. Serial No. 11,267.

This invention relates to attachments for check row planters.

An object of the invention is to provide an attachment for check row planters comprising a marker for indicating the alinement of the rows, and improved means whereby operation of the marker may be retarded at the will of the operator in order to maintain an alinement of the previous markings irrespective of variations in the evenness of the ground. By this improved structure the alinement is maintained across depressions in the ground or over high points and rises.

Another object of the invention is to provide an improved attachment for check row planters having a device for operating the seed valves by the marker, the device for operating the seed valves by the marker being provided with compensating means whereby the parts are maintained in proper cooperative relationship when the planter runners are raised.

Other objects will appear from the following description reference being made to the accompanying drawing, in which Fig. 1 is a side elevation of a standard commercial type of planter equipped with my improved attachment.

Fig. 2 is a rear elevation of the right hand side of the planter showing parts of the attachment in connection with the axle shaft and wheel.

Fig. 3 is a sectional view on the line 3—3 of Fig. 2.

Fig. 4 is a view showing in section the compensator device in the connections for operating the seed valves.

Fig. 5 is an enlarged view of one of the marker devices.

The planter in which the present attachment is shown comprises the usual frame 1, axle shaft 2 rotatively journaled in and supporting the frame 1, ground wheels 3 for supporting the axle shaft and the frame and being rotative relative to the axle shaft, seed hoppers 4, runners 5, shaft 6 for operating the seed valves controlling the discharge of the seed from the hoppers, and lift lever 7 for raising the runners 5 from the ground, as usual.

My invention is an attachment for this planter and is operative to accomplish all of its intended objects and purposes in an efficient manner. The attachment comprises a clutch member 8 rigid with and extending inwardly from the right hand wheel 3. A cooperating clutch member 9 is keyed to the axle shaft 2 and is shiftable thereon into and out of engagement with the clutch member 8. When the clutch is closed the axle shaft 2 is rotated with the wheel 3, but when the clutch is open the wheel 3 rotates independently of the axle shaft. A spring 10 encircles the shaft 2 between the inner end of the clutch member 9 and the adjacent portion of the frame 1 and is effective to hold the clutch member 9 in engagement with the clutch member 8 as required to rotate the axle shaft 2 by the wheel 3 as an incident to travel of the planter. A ratchet wheel 11 is attached to the clutch member 9 and is embraced between the arms of a bifurcated lever 12 pivotally supported by the clutch member 9. A pawl 13 pivoted on the lever 12 is engageable with the ratchet wheel 11 so that when the lever 12 is pushed forwardly a turning movement may be imparted to the axle shaft to turn the marker far enough so that neither end will contact with the ground nor with the seed valve operating device, leaving the wheels 3 free to turn idly, and operative connections 14 are provided for controlling the pawl 13 so that turning movement may be imparted to the axle shaft by the lever 12, or not, as desired. The lever 12 is also operative to disengage the clutch members by moving the clutch member 9 out of engagement with the clutch member 8 in opposition to the power of the spring 10. An angular arm 15 rigid with and extending laterally from the lever 12 has its depending extremity within a cam groove 16 formed in an arcuate plate 17 in rigid connection with the adjacent part of the frame 1. The cam groove 16 extends obliquely forwardly and toward the left from the lever 12, so that when said lever is pushed forwardly the clutch member 9 is drawn inwardly out of engagement with the clutch member 8 leaving the wheel 3 free to turn on the axle shaft 2 which then ceases to rotate.

The marker device is in rigid connection with the axle shaft 2 and includes a pair of spaced bars 18, one of which has its ends bent to provide lateral extensions 19 for connection with the other. The marker frame, comprising the connected bars 18 and constructed as described and as shown in Fig.

2, terminates at both ends inside of the plane of the periphery of the wheel 3 so that the rigid portions of the marker frame will not press heavily upon the ground. An elastic marker device is supported by each end of the marker frame, each of the same comprising a shoe 20 supported on the outer ends of a pair of rods 21 extending radially through the end connections 19 of the marker frame and through guide webs 22 attached to the bars 18. A spring 23 encircles each of the rods 21, the inner ends of said springs bearing against the webs 22 and the outer ends of said springs bearing against abutments 24 in connection with the rods 21 and thereby yieldingly holding the marker devices in their outward adjustments. This permits the markers to yield inwardly in case they strike rock or other hard materials. The marker shoes 20 are supported somewhat beyond the plane of the periphery of the wheel 3, so that while the wheel operates upon the ground the markers will make impressions at the side of the wheel track.

A lever 25 is attached to the shaft 6 and is connected to a vertical arm of a bell crank lever 26 by the compensating device. As shown the compensating device comprises a rod 27 having one end pivoted to the lever 26 and the opposite end extending into a tubular element 28 pivoted to the lever 25. A coiled spring 29 is around the rod 27 within the tube 28 between the head 30 on the end of the rod and the outer end of the tube. These devices provide an elastic connection that will yield properly when the hopper frame is raised by operation of the lift lever 7 in the usual and familiar manner. The bell crank lever 26 is pivoted upon a support 31. The free end of the bell crank lever extends into the path of movement of the ends of the marker so that when the marker is rotated with the wheel 3 the bell crank lever is operated twice during each complete rotation of the wheel.

By operating the lever 12 to rotate the axle 2 at the start, the marker may be turned to position to make alined impressions or marks when the planter moves. By obtaining proper adjustment at the start the marker will be caused to operate the seed valves to drop the seed in alinement with the preceding rows and to make impressions upon the ground whereby the following rows can be alined.

The marker device is controlled so that the rotation thereof can be retarded by releasing the clutch member 9 permitting the wheel 3 to turn freely while the marker remains stationary. The clutch is released when turning the planter at the ends of rows and is also controlled by the lever 12 so that it will only operate to make impressions in alinement with previous impressions and to discharge the seed in line with the previous rows.

From the foregoing it will be seen that the invention comprises an improved attachment for planters that may be readily applied to planters of usual construction by the owners, or that may be included in the planters by the manufacturers. The construction and arrangement of the parts may be varied considerably from the structure and arrangement shown, without departure from the nature and principle of the invention.

I do not restrict myself unessentially, but what I claim and desire to secure by Letters Patent is:

In a planter having a rotary axle, a ground wheel selectively connected to said axle and a seed valve rock shaft; an attachment for turning the seed valve rock shaft in one direction comprising a lever attached to said shaft; a bell crank lever; an elastic connection for operating said first lever by said bell crank lever; comprising a tube pivoted to the lever, a rod connected to the bell crank lever and projecting into the tube, and a spring retarding the withdrawal of the rod from the tube and a marker rigid on said axle and arranged to operate said bell crank lever when said axle is rotated by said ground wheel.

WILLIAM J. BARCLAY.